Figure 1:
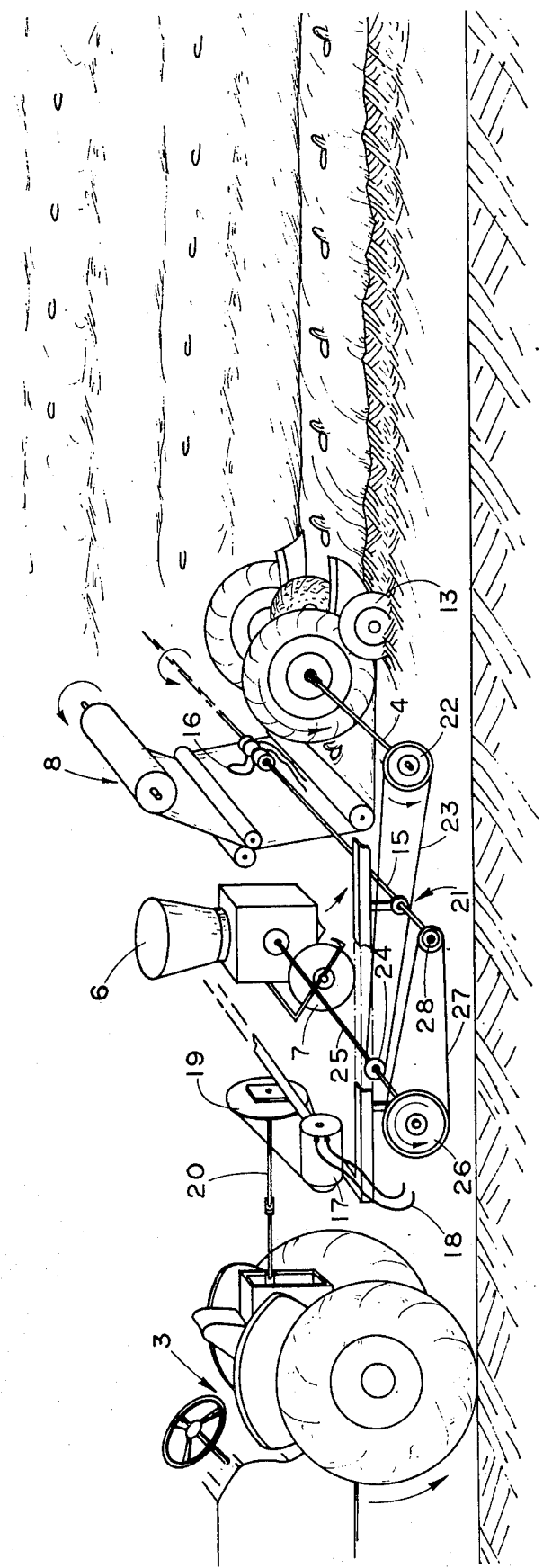

United States Patent [19]

Leavitt et al.

[11] 3,945,330
[45] Mar. 23, 1976

[54] SEED PLANTING UNIT

[75] Inventors: Chaim Leavitt, Sde' Varbourg;
Yekutiel Alper, Rishon Le Zion;
Tzvi Gruenewald, Bat-Yam, all of
Israel

[73] Assignee: The State of Israel Ministry of Agriculture, Jerusalem, Israel

[22] Filed: July 25, 1974

[21] Appl. No.: 491,662

[52] U.S. Cl. ........................................ 111/1; 47/56
[51] Int. Cl.² ........................................ A01C 11/00
[58] Field of Search ................ 111/1, 2, 3; 47/56, 9

[56] References Cited
UNITED STATES PATENTS

| | | | |
|---|---|---|---|
| 3,103,186 | 9/1963 | Saifuku | 111/2 |
| 3,175,524 | 3/1965 | Kapplemann | 111/1 X |
| 3,180,290 | 4/1965 | Kapplemann et al. | 111/2 X |
| 3,306,239 | 2/1967 | Martin, Jr. | 111/1 |
| 3,315,623 | 4/1967 | Tschudy, Jr. | 111/1 |
| 3,559,599 | 2/1971 | Hoadley | 111/1 |

*Primary Examiner*—Stephen C. Pellegrino
*Attorney, Agent, or Firm*—Donald M. Sandler

[57] ABSTRACT

A seed planting unit carries a seed planter that dispenses a predetermined amount of seed into the ground at predetermined intervals in response to the coupling between a ground engaging wheel supporting the unit and the drive means of the seed planter. A film dispenser is also carried by the unit for laying film on the ground over the planted seeds; and a transmission is provided for synchronizing the perforating of the film before it is laid with the dispensing of the seeds by the seed planter so that the apertures in the film are aligned with the seeds deposited in the ground.

6 Claims, 3 Drawing Figures

SEED PLANTING UNIT

This invention refers to a seed planting unit of the kind comprising a seed planter carried by a displaceable structure and actuatable, upon displacement of said structure, so as to seed an area over which the structure is displaced with predetermined amounts of seed and at predetermined spatial intervals and/or densities.

A problem arises when it is desired to coordinate the operating of seeding with an associated operation which is to take place simultaneously or sequentially with the seeding operation. Such an associated operation can, for example, be constituted by the covering of the row which has been or is to be seeded by a plastic film. Covering a seeded bed with a plastic film carries with it certain distinct advantages such as raising the bed temperature and retaining an adequate degree of moisture within the bed.

In the past this technique has involved laying the plastic film, manually apertuting it at desired intervals and sewing the seed in the bed through the apertures thus formed. Alternatively, the bed can be preliminarily covered with a pre-apertured strip and the seeds are subsequently sewn through the apertures. In a still further alternative the bed is seeded continuously along its length and is then covered with a pre-apertured strip which is formed of a light absorbing material and in this case germination and growth only take place in the region of the apertures.

With all these prior proposals, separate steps are involved of seeding, strip laying and aperturing and these are obviously time consuming and expensive.

It has been furthermore proposed simultaneously to effect seeding and aperturing by means of a combined aperturing and seeding tool which penetrates through the laid plastic strip into the bed and deposits the seeds in the hole made in the bed and then withdraws. This proposal has been found to be impractical seeing that, on the one hand, the aperturing tool tends to become clogged with earth and on the other hand no effective means are provided for ensuring that the seeds are subsequently covered with earth.

It is accordingly an object of the present invention to provide a new and improved seed planting unit capable of carrying out, simultaneously or sequentially, seeding and at least one associated operation such as, for example, film laying and aperturing and in which the above referred to disadvantages are substantially avoided or reduced.

According to the present invention there is provided a seed planting unit comprising a. a support structure, b. at least one wheel coupled to the structure and rotatable upon displacement thereof, c. a seed planter carried by the structure, d. an auxiliary mechanism carried by the structure, and e. a transmission, coupling said wheel, on the one hand to the seed planter and, on the other hand, to said mechanism so as to impart actuating drives to the planter and to said mechanism.

Preferably there is furthermore provided a plastic film dispenser carried by the structure and from which plastic film can be continuously dispensed and laid as the unit is displaced and wherein the auxiliary mechanism is constituted by a plastic film aperturing mechanism, the actuating drives serving to actuate the mechanism and the planter in synchronism.

Preferably the aperturing mechanism is constituted by an electric heating element which is rotatably displaceable into and out of engagement with adjacently located plastic film.

With such a preferred embodiment of a seed planting unit the displacement of the unit, either as a trailer attached to a tractor or under self or manual propulsion results in the actuation of the seed planter. As a consequence, predetermined quantities of seeds are laid along the path of travel of the unit at predetermined intervals and/or densities. At the same time plastic film is dispensed from the unit and prior to its being laid, is apertured by the aperturing mechanism which is actuated in complete synchronism with the actuation of the planter. Thus apertures are formed in the plastic film at spacings corresponding completely to the spacing between the separate seedings. If now the aperturing mechanism and planter are preliminarily synchronised so as to ensure that the first apertured portion of the film coincides with the first seeding it will follow automatically that subsequent seedings are substantially aligned with subsequent and successive apertured portions of the film. Any slipping which may take place in the travel of the planting unit is uniformly transmitted both to the planter and to the aperturing mechanism and in this way it is ensured that full coordination of the seeding and the aperturing is achieved.

In this way and on the basis of a single continuous operation an extended bed is sequentially seeded and covered with apertured plastic strip, the aperturing coinciding completely with the seeding regions.

Preferably the unit is additionally provided with means such as a pressure wheel carried thereby, downstream of the aperturing mechanism, which presses down on the apertured portions of the strip thereby ensuring that the seeds are pressed down via the strip. The unit is additionally provided with means by means of which earth on each side of the elongated bed is strewn on the longitudinal edges of the strip thereby retaining it in position on the bed.

Figure 3:
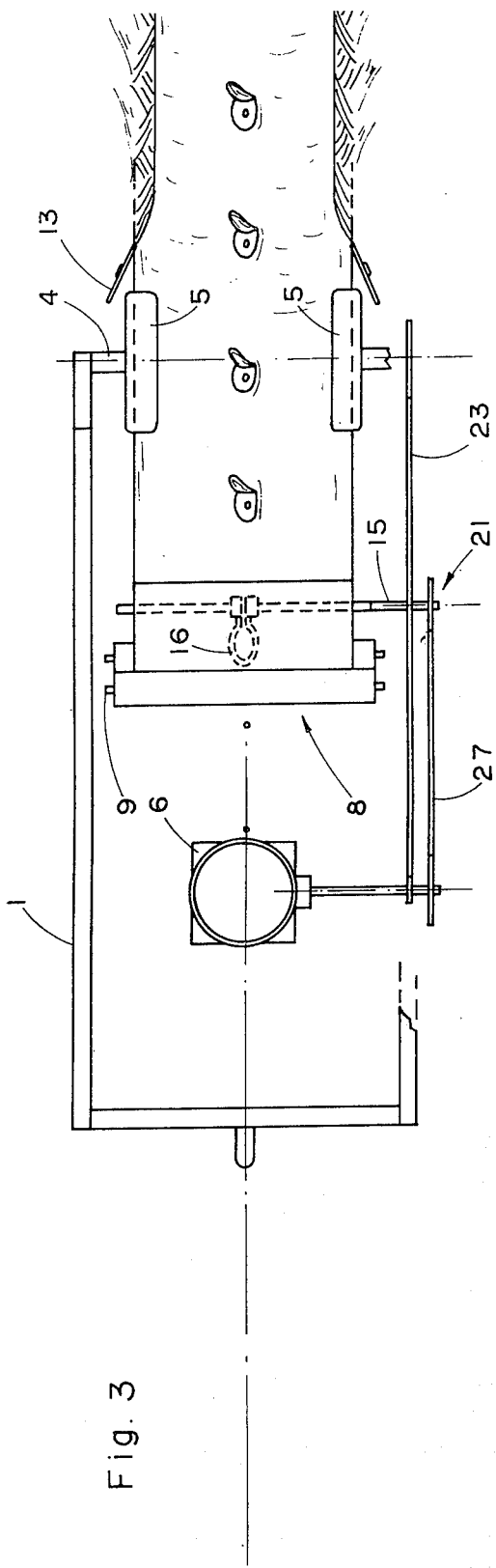
Figure 2:
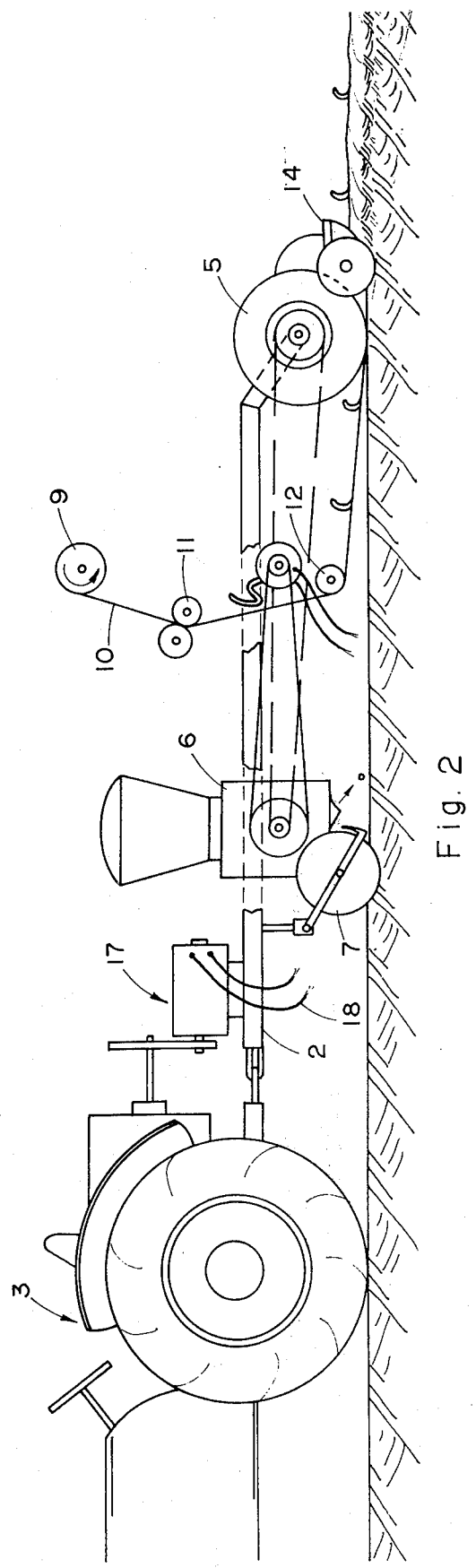

One embodiment of a seed planting unit in accordance with the present invention will now be described by way of example and with reference to the accompanying drawings in which, FIG. 1 is a schematic perspective view of a seed planting unit in accordance with the present invention coupled to a tractor, FIG. 2 is a longitudinally sectioned view of the unit shown in FIG. 1, and FIG. 3 is a plan view from above of the unit shown in FIG. 1.

As seen in the drawings the seed planting unit comprises a displaceable, frame-like, support structure 1 which is adapted to be coupled via a trailer coupling 2 to a tractor 3. Journalled in one end of the support structure is an axle 4 on which are rotatably mounted a pair of transport wheels 5.

A seed planer 6 (which can conveniently be of the hill drop kind such as are, for example, manufactured by International Farm Harvester) is coupled to and carried by the support structure 1 and is provided with its own transport wheels 7.

A plastic film dispenser unit 8 comprises means (not shown) for rotatably supporting a plastic film roll 9 the film 10 thus dispensed passing between a pair of rollers 11 and underneath a roller 12 into a laying position, the rollers 11 and 12 being journalled in the support structure. Rotatably mounted on the support structure in planes inclined to the longitudinal axial plane of the unit and rearwardly of the transport wheels 5 is a pair of discs 13 located adjacently a pair of inclined guides 14.

Mounted on an axle 15 journalled to the support structre 1 is a looped heating element 16 located adjacent a central portion of the extended plastic strip as this passes between rollers 11 and 12. The heating element 16 is fed with supply current via slip-ring contacts (not shown) from a generator 17 to which it is coupled by a supply line 18, the generator being actuated via a transmission 19 coupled, by means of a power take off 20, to the tractor 3.

The rotary axle 4 of the transport wheels 5 is coupled via a transmission 21 to the seed planter 6 and the axle 15 of the heating element 16.

The transmission 21 comprises a first transmission wheel 22 mounted on the axle 4 and coupled by means of a drive chain 23 to a second transmission wheel 24 which is fixedly mounted on a drive shaft 25 of the planter 6. A third transmission wheel 26 is also fixedly mounted on the drive shaft 25 and is coupled via a transmission chain 27 to a fourth transmission wheel 28 fixedly mounted on the end of the axle 15.

In operation, the planting unit is towed by means of the tractor 3 and plastic film is dispensed from the roller 16 onto the ground along a row which constitutes a seed bed. The transport wheels 5 press down the longitudinal edges of the plastic film, the discs 13 displace inwardly earth onto the edges so as to hold down the edges of the laid strip whilst the guides 14 are instrumental in preventing the displacement of the earth beyond the edges of the strip.

With the displacement of the unit, a drive is simultaneously transmitted from the transport wheels 5 through the transmission 21 to the seed planter 6 on the one hand and the heating element axle 15 on the other hand. As a result of this drive the planter is actuated so as to dispense predetermined amounts of seed at predetermined spaced apart intervals. At the same time the axle 15 rotates so as to bring the U-shaped element 16 into contact with the plastic film so as to make therein a U-shaped incision. As a result of the coordination of the drives to the planter and the heating element the U-shaped apertures are formed in the film at spaced apart intervals which correspond completely to the intervals between the seed dispensing. Complete coordination between the aperturing and seed dispensing is obtained initially by manually rotating the axle 15 or alternatively the heating element mounted thereon so as to ensure that, as the apertured strip is laid upon the seeded bed the first apertured portion is located above the first set of seeds. Once this initial coordination has been achieved the subsequent coordination of aperturing and seeding is effected automatically. Thus any slipping of the transport wheels is transmitted simultaneously both to the planter and to the aperturing mechanism.

In this manner and in a single sequential operation a longitudinal row is seeded at spaced apart intervals and there is immediately thereafter laid on the seeded bed a plastic strip which has been apertured in such a manner that the apertures coincide correctly with the regions of seeding. The plastic strip itself is held in position and the seeds are pressed down by means of the central pressure wheel. The U-shaped aperture formed in the strip by means of the aperturing element 16 implies that there is left, retained on the strip, a tongue which should it cover the aperture is pushed aside by the sprouting plant without interfering with germination. This incomplete aperturing of the strip and leaving the tongue attached thereto is advantageous in avoiding undesirable littering of the site as a result of aperturing.

It will be appreciated that with the mechanism just described aperturing can be effected at any required interval in coordination with the intervals of seeding. Similarly, by adjusting the size of the aperturing element the aperture formed can equally well be adjusted.

Whilst in the arrangement described above a heating element has been used in order to effect aperturing, this operation can be effected in other ways such as, for example, by using a rotating punch or the like.

It will furthermore be appreciated that whilst in the arrangement described above seeding and aperturing have been fully synchronized the mechanism described is applicable to the case where, for example, seeding takes place continuously whilst aperturing takes place at predetermined intervals. In such a case complete synchronism between seeding and aperturing is not essential but the present mechanism allows such an operation to take place more effectively than in the past where two separate operations were required.

Finally, whilst in the specific embodiment described above, seeding has been associated with a synchronized auxiliary operation which is constituted by the aperturing of an overlaying plastic strip, the inventive concept can be applied to other forms of auxiliary operations such as, for example, where it is desired to surround a seeded area with a herbicide or the like. In such a case the auxiliary operation would involve the synchronous application of the herbicide to the region surrounding the seeds.

We claim:

1. A seed planting unit comprising:
   a. a support structure carrying a ground engaging wheel that rotates in response to displacement of the structure on the ground;
   b. a seed planter carried by said structure and having operable means for depositing seeds in the ground;
   c. film dispenser means carried by said structure downstream of the seed planter for dispensing film and laying it on the ground over the seeds deposited by the seed planter as said structure is displaced;
   d. a film aperturing mechanism having operable means for making apertures in said film before it is laid on the ground; and
   e. transmission means coupling rotation of the groung engeging wheel to the operable means of both the seed planter and the film aperturing mechanism for synchronizing their operation such that the apertures in the film laid on the ground by the film dispenser are aligned with the seeds deposited in the ground by the seed planter.

2. A seed planting unit according to claim 1 wherein said unit furthermore comprises a pair of transport wheels mounted on said structure rearwardly of said dispenser in the direction of travel of said unit and so located as to pass over respective longitudinal edges of the laid film, and a centrally disposed pressure wheel mounted on said structure rearwardly of said dispenser in the direction of travel of said unit intermediate said transport wheels and so located as to pass over a central axial portion of the laid film.

3. A seed planting unit according to claim 1 wherein said aperturing mechanism is mounted on a rotary axle journalled with respect to said structure and coupled to said transmission means so as to be driven thereby.

4. A seed planting unit according to claim 3 wherein said aperturing mechanism is constituted by an electric heating element rotatably displaceable by said axle into and out of engagement with adjacently located film.

5. A seed planting unit according to claim 4 wherein said heating element is constituted by a U-shaped open loop.

6. A seed planting unit according to claim 1 wherein said transmission means includes a positive drive linking rotation of the ground engaging wheel to the operable means of the seed planter, and a positive drive linking the operable means of the seed planter to the operable means of the aperturing mechanism.

\* \* \* \* \*